(12) United States Patent
Connor et al.

(10) Patent No.: US 8,732,212 B2
(45) Date of Patent: May 20, 2014

(54) SYSTEM FOR SIMPLIFYING AN XML-BASED SCHEMA

(75) Inventors: Holly Connor, Batavia, OH (US); Ariel Farkash, Shimshit (IL); John T. E. Timm, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 159 days.

(21) Appl. No.: 13/180,790

(22) Filed: Jul. 12, 2011

(65) Prior Publication Data

US 2013/0018924 A1    Jan. 17, 2013

(51) Int. Cl.
    *G06F 17/30*    (2006.01)
(52) U.S. Cl.
    USPC .......................................... 707/803; 707/804
(58) Field of Classification Search
    USPC .................................. 707/803, 804
    See application file for complete search history.

(56) References Cited

U.S. PATENT DOCUMENTS

| 7,296,226 | B2 | 11/2007 | Junkermann | |
|---|---|---|---|---|
| 2003/0018660 | A1* | 1/2003 | Martin et al. | 707/500 |
| 2005/0289455 | A1* | 12/2005 | Hays et al. | 715/513 |
| 2006/0031749 | A1 | 2/2006 | Schramm et al. | |
| 2006/0150146 | A1* | 7/2006 | Meijer et al. | 717/108 |
| 2008/0127217 | A1 | 5/2008 | Wang | |
| 2008/0134139 | A1* | 6/2008 | Krouse et al. | 717/105 |
| 2008/0183736 | A1* | 7/2008 | Westerinen et al. | 707/101 |
| 2009/0125512 | A1* | 5/2009 | Robertson et al. | 707/5 |

OTHER PUBLICATIONS

Article entitled "Model-Driven Health Tools (MDHT) CDA Tools Overview" by Timm et al., dated Sep. 21, 2009.*
Article entitled "Model-Driven Health Tools Design and Implementation of CDA Templates" by Timm et al., dated Oct. 29, 2010.*
Article entitled "Dealing with a set of Large XML schemes" by Timm, dated Nov. 11, 2008.*
Article entitled "Ginger: Data Abstraction Tooling Technology for Managing the Complexities of Industry-based Standards", by IBM, dated Apr. 6, 2013.*
Article entitled "XML Schema Lightener" by XML Helpline, dated Jun. 19, 2010.*
Melnik et al. "A Layered Approach to Information Modeling and Interoperability on the Web" ECDL'00 Workshop on the Semantic Web, (Sep. 2000), available at http://ilpubs.stanford.edu:8090/450/1/2000-30.pdf, 13 pages, last accessed Jul. 12, 2011.
Weist et al. "A Knowledge-Based System for Model Translation" Proceedings of the 39th Annual Meeting of the Decision Sciences Institute, (Nov. 2008), available at http://www.decisionsciences.org/Proceedings/DSI2008/docs/487-2212.pdf, 6 pages, last accessed Jul. 12, 2011.

(Continued)

*Primary Examiner* — Mahesh Dwivedi
(74) *Attorney, Agent, or Firm* — Jeffrey T. Holman

(57) ABSTRACT

A method for simplifying an extensible markup language (XML) schema, including: identifying data in an instance specification as variable or fixed, wherein the instance specification corresponds to a complex XML schema; determining a set of types including the variable data, wherein the set of types conforms to a structure of the complex XML schema; capturing the set of types as metadata annotations associated with the instance specification; and generating a simplified XML schema from the instance specification, wherein the simplified XML schema is stored on a memory device.

17 Claims, 4 Drawing Sheets

(56) References Cited

OTHER PUBLICATIONS

Ozianyi et al. "XML-Driven Framework for Policy-Based QoS Management of IMS Networks" IEEE Global Telecommunications Conference, 2008, (Nov. 2008), available at http://202.194.20.8/proc/GLOBECOM2008/DATA/04-03-01.PDF, 6 pages, last accessed Jul. 12, 2011.

Carlson et al. "A Model-Driven Approach for Biomedical Data Integration" Studies in Health Technology and Informatics, 160, Pt. 2, (2010), pp. 1164-1168.

Timm et al. "Large Scale Healthcare Data Integration and Analysis using the Semantic Web" Studies in Health Technology and Informatics, 169, (2011), pp. 729-733.

* cited by examiner

SYSTEM FOR SIMPLIFYING AN XML-BASED SCHEMA

BACKGROUND

Information models based on extensible markup language (XML) may be complex and difficult to implement. This may be particularly evident in industry standard information models (e.g., healthcare) that possess one or more of the following characteristics:

1. Large number of complex types (elements and attributes)
2. Generic/abstract (high-level domain concepts)
3. High degree of extensibility/customization is possible
4. Recursive—leads to instances with arbitrarily deep nesting
5. Instances contain a high ratio of fixed to variable data To build applications that produce, consume and validate such XML-based information models, additional constraints are often placed on the base standard to define use-case specific structure and content. Software code created to implement these capabilities and validate these constraints may be very specific to a particular application, and can be difficult to maintain and reuse across multiple applications. It is possible to create abstractions on top of these data models and write transformations between the abstractions and the complex schema, but the process is typically manual and labor intensive.

SUMMARY

Embodiments of a system are described. In one embodiment, the system is an extensible markup language (XML) modeling. The system includes: a design-time engine configured to: identify data in an instance specification as variable or fixed, wherein the instance specification corresponds to a complex XML schema; determine a set of types comprising the variable data, wherein the set of types conforms to a structure of the complex XML schema; capture the set of types as metadata annotations associated with the instance specification; and generate a simplified XML schema from the instance specification; and a memory device configured to store the simplified XML schema. Other embodiments of the system are also described.

Embodiments of a computer program product are also described. In one embodiment, the computer program product includes a computer readable storage device to store a computer readable program, wherein the computer readable program, when executed by a processor within a computer, causes the computer to perform operations for simplifying an extensible markup language (XML) schema. The operations include: identifying data in an instance specification as variable or fixed, wherein the instance specification corresponds to a complex XML schema; determining a set of types including the variable data, wherein the set of types conforms to a structure of the complex XML schema; capturing the set of types as metadata annotations associated with the instance specification; and generating a simplified XML schema from the instance specification, wherein the simplified XML schema is stored on a memory device. Other embodiments of the computer program product are also described.

Embodiments of a method are also described. In one embodiment, the method is a method for simplifying an extensible markup language (XML) schema. The method includes: identifying data in an instance specification as variable or fixed, wherein the instance specification corresponds to a complex XML schema; determining a set of types including the variable data, wherein the set of types conforms to a structure of the complex XML schema; capturing the set of types as metadata annotations associated with the instance specification; and generating a simplified XML schema from the instance specification, wherein the simplified XML schema is stored on a memory device. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
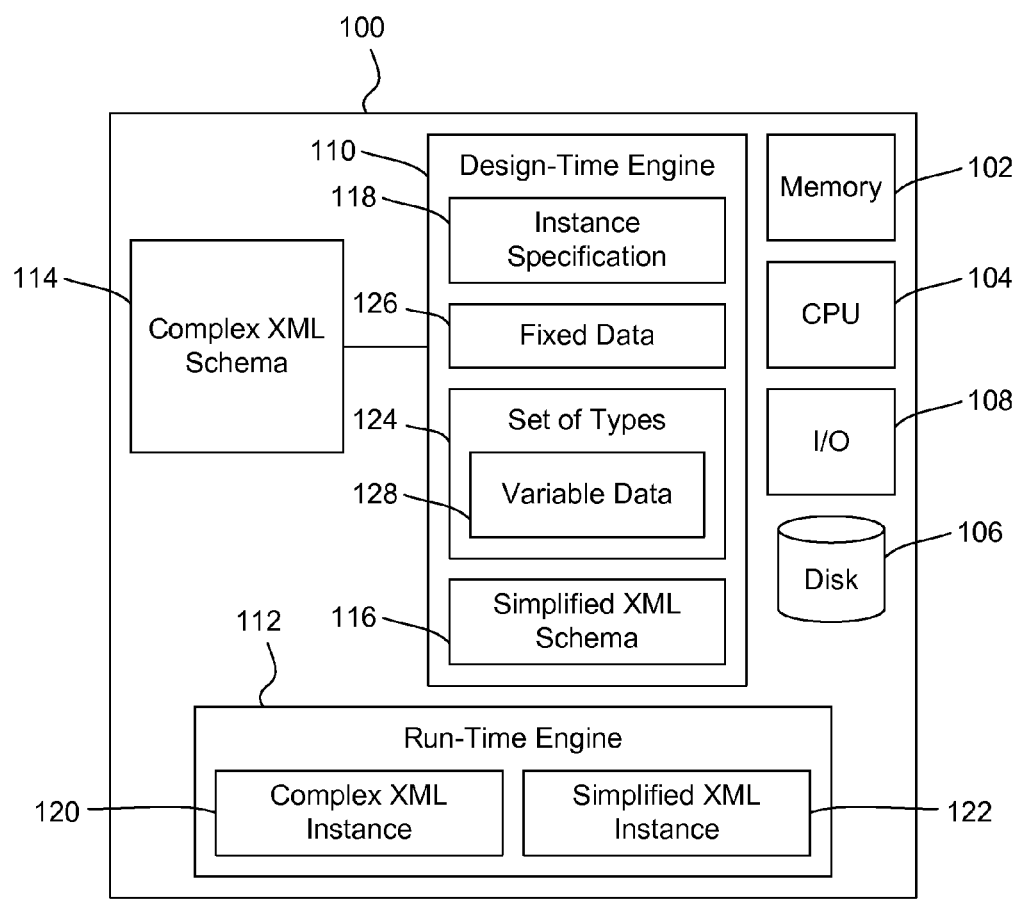
FIG. 1 depicts a schematic diagram of one embodiment of an extensible markup language (XML) modeling system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments present a system and method for simplifying an extensible markup language (XML) schema. More specifically, the system identifies fixed and variable data in a complex schema and creates a simplified XML schema based on the variable data during design-time. The simplified schema maintains the cardinality of the complex schema, such that instances of the simplified schema may be converted into instances of the complex schema during run-time.

Because XML schemas can often be very complex, building applications to produce, consume or validate a complex XML schema may require additional constraints for defining use-case specific structure and content. The applications may be very specific and difficult to maintain due to the additional constraints, and may be difficult to reuse across multiple applications. In order to more effectively reuse a given XML model, the complex XML schema may be broken down into a simplified XML schema.

For example, a complex schema may include elements, attributes, rules, or other data that is highly specific to a given instance specification of the complex schema. Because the given instance specification includes data that may not be useful in other instance specifications related to the complex schema, using the complex schema for other use-case scenarios would likely require modification of the schema. A given instance specification of the modified schema may also include data that may not be useful in the original instance specification of the complex schema. An abstract schema that is able to account for the similarities and differences between the two specialized instance specifications may be useful when modifying the specialized instance specifications or when creating additional instance specifications that may also differ from the other instance specifications.

Conventional methods for simplifying XML schemas may require manual simplification during design-time of an XML-based information model. Because XML-based models can be complex, manual simplification of such models may be difficult to implement, labor intensive, and time-consuming. An automated or partially automated process for simplifying an XML schema may reduce much of the time and effort spent at design-time, and may allow the creation of a simpler and more efficient design of a schema based on a complex model that can be used across various similar, but different, use-case scenarios.

The system and method described herein allows static or fixed information to be included in all instances of a given application or model through various automated operations, reducing the amount of manual designing/development required. The system at least partially automates the process of creating one or more simplified models that represent abstractions of a complex model. The system also facilitates the process of creating bi-directional transformations between instance of the simplified model(s) and instances of the more complex model.

A simplified model may include one or more of the following characteristics:
1. Contains fewer complex types than the original schema
2. Contains more domain-specific type names relevant to a particular use case or application scenario
3. Limited number of allowed instance structures (reduced optionality)
4. Reduces the amount of nesting necessary to precisely represent variable pieces of information
5. Only spans the set of variable pieces of information (what may be specified by the application)

Figure 5:
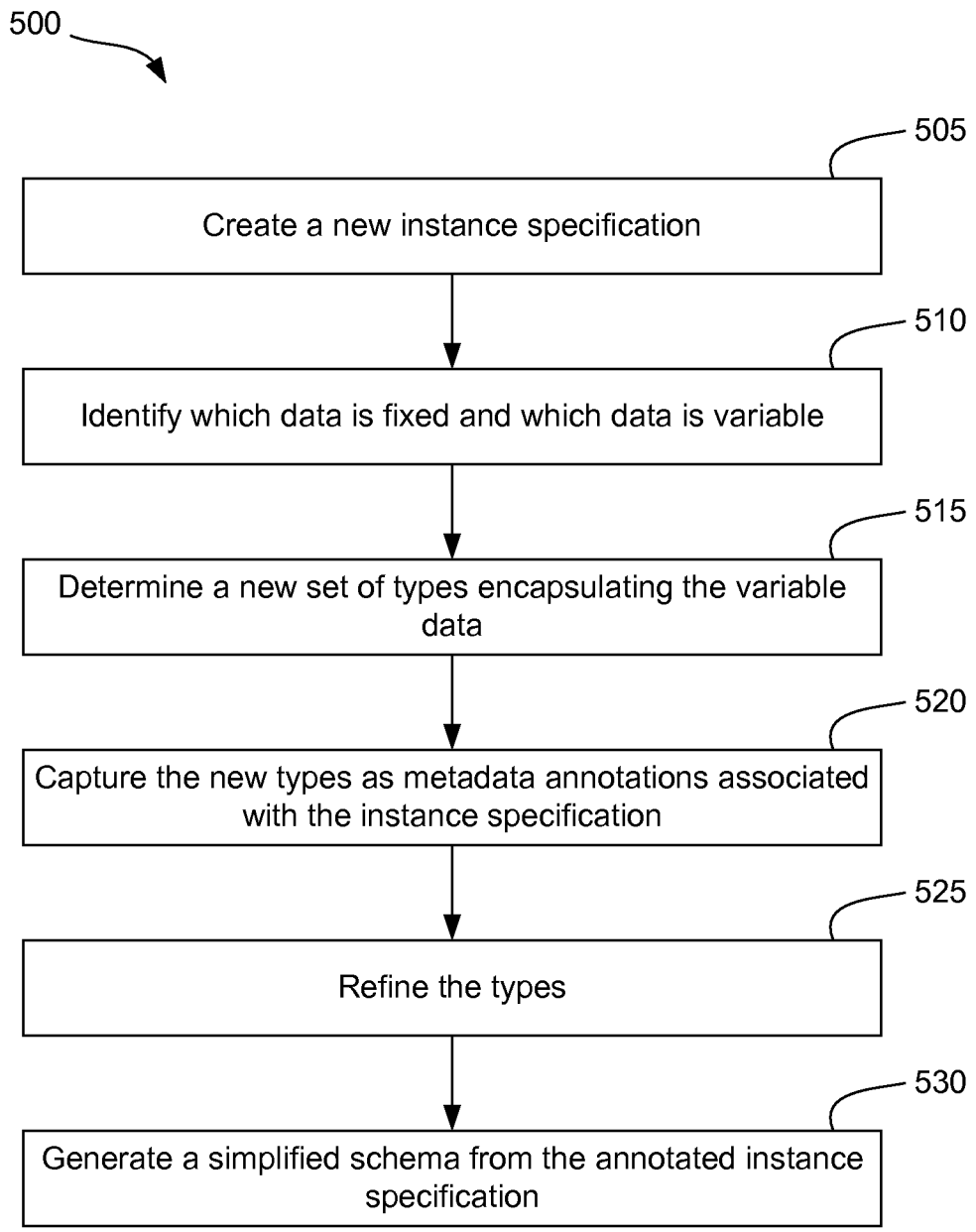
FIG. 5 depicts a flow chart diagram of one embodiment of a method for simplifying an XML schema.

FIG. 1 depicts a schematic diagram of one embodiment of an extensible markup language (XML) modeling system 100. The depicted XML modeling system 100 includes various components, described in more detail below, that are capable of performing the functions and operations described herein. In one embodiment, at least some of the components of the XML modeling system 100 are implemented in a computer system. For example, the functionality of one or more components of the XML modeling system 100 may be implemented by computer program instructions stored on a computer memory device 102 and executed by a processing device 104 such as a CPU. The XML modeling system 100 may include other components, such as a disk storage drive 106, input/output devices 108, a design-time engine 110, and a run-time engine 112. Some or all of the components of the XML modeling system 100 may be stored on a single computing device or on a network of computing devices. The XML modeling system 100 may include more or fewer components or subsystems than those depicted herein. In some embodiments, the XML modeling system 100 may be used to implement the methods described herein as depicted in FIG. 5.

In one embodiment, the design-time engine 110 is configured to receive a complex XML schema 114 or model and convert the complex schema 114 to a simplified XML schema 116. In one embodiment, the complex schema 114 is an existing schema that is imported into the design-time engine 110. The design time engine creates an instance specification 118 that may represent a prototypical instance 120 of the complex schema 114. The instance specification 118 of the complex schema 114 includes a present structure of the complex schema 114, including nested elements and/or attributes as pieces of information or data. In another embodiment, the design-time engine 110 creates a new instance specification 118 based on the complex schema 114.

In some embodiments, the complex schema 114 includes fixed data 126 and/or variable data 128. The fixed data 126 may include pieces of information that is constant over more than one instance 120 of the complex schema 114. For example, in a complex schema 114 corresponding to a given document, a field in the document that contains the same information in every copy or instance of that document may be considered fixed data 126. In some embodiments, the variable data 128 includes pieces of information that may differ over each instance 120 of the complex schema 114. By identifying the data within the complex schema 114 as fixed or variable, the design-time engine 110 may determine which information is included in the simplified schema 116.

In one embodiment, the design-time engine 110 identifies the fixed data 126 and variable data 128 using an automated process. The automated process may be able to determine fixed information based on a plurality of instances 120 of the complex schema 114. The design-time engine 110 may compare the instances to determine any fields that all of the instances may have in common. For example, if the complex schema 114 identifies a clinical document model used in a healthcare or medical environment, each instance of the model may be a document or file corresponding to an individual patient. The design-time engine 110 may determine that at least one of the fields in each of the documents has the same value across all instances, such as a healthcare provider. The field is determined to have a common value, and the field is identified as fixed data 126.

In one embodiment, the design-time engine 110 identifies the fixed data 126 and variable data 128 using a manual process. The manual process may be implemented by a user identifying the pieces of information or fields as either fixed data 126 or variable data 128. A manual process may allow the user to exercise some amount of control over the XML modeling system 100.

After the design-time engine 110 identifies the fixed data 126 and variable data 128 within the instance specification 118 of the complex schema 114, whether automatically or manually, the design-time engine 110 then uses the identifications of fixed data 126 and variable data 128 to determine or suggest a new set of types 124 that encapsulates the variable data 128. Information about the set of types 124 is stored as metadata annotations associated with specific locations in the instance specification 118. The metadata annotations may describe various aspects of the set of types 124, including, but not limited to, a relationship of each type 124 with other types 124, a cardinality of the set of types 124, and descriptions of the values that may be inserted into each type 124.

The design-time engine 110 then refines the set of types 124. The operation of refining the set of types 124 may include manipulating the set of types 124 through various operations, including renaming each type 124 according to a predetermined configuration, simplifying the structure of the types 124, restricting the cardinality of the types 124, simple type conversion from one type 124 to another, or other methods of refinement according to the intended implementation of the simplified schema 116. Refining may allow the design-time engine 110 to further simplify the complex schema 114. The refinement operation may be at least partially automated. In one embodiment, a user specifies a configuration for the refinement operation.

After refining the set of types 124, the design-time engine 110 generates one or more simplified schemas 116 from the annotated instance specification 118. The simplified schema 116 includes the metadata annotations inserted by the design-time engine 110 for the refined set of types 124, and retains the cardinality of the original instance specification 118 corresponding to the complex schema 114.

In one embodiment, the XML modeling system 100 also includes a run-time engine 112. In one embodiment, the run-time engine 112 is configured to take one or more instances 122 of the simplified schema 116 and expand those instances back into the complex schema 114. The instance specification 118 created by the design-time engine 110 may persist in the XML modeling system 100 so that it may be used by the run-time engine 112. The instance specification 118 may be saved to the memory device 102 or other storage device. The run-time engine 112 may also allow the XML modeling system 100 to extract instances 122 of the simplified schema 116 from an instance 120 of the complex schema 114.

In some embodiments, the run-time engine 112 may be initiated after the design-time engine 110 has completed generating the simplified schema 116. In some embodiments, the design-time engine 110 may be re-initiated to alter the generated simplified schema 116 after the run-time engine 112 has been initiated or to create new simplified schema 116 for the same complex schema 114 or for a different complex schema 114.

Figure 2:
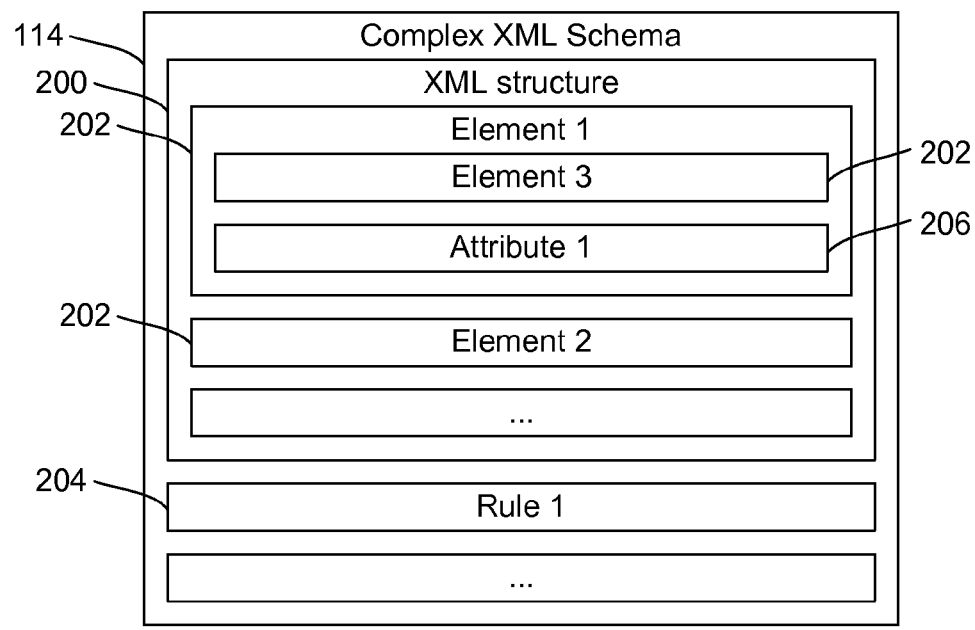
FIG. 2 depicts a schematic diagram of one embodiment of a complex XML schema.

FIG. 2 depicts a schematic diagram of one embodiment of a complex XML schema 114. While the XML modeling system 100 described herein is described in conjunction with the complex schema 114 of FIG. 2, the XML modeling system 100 may be used in conjunction with any complex schema 114.

An XML schema generally includes a description of the structure 200 and content of an XML document or collection of documents. The XML schema may describe an order of the elements 202, data types 124 for each piece of information in the XML document, and/or other rules 204 that identify certain constraints on the document.

As described herein, the complex XML schema 114 may describe the full structure of the instance specification 118. The relationship between each of the pieces of information within the instance specification 118, including a cardinality of the instance specification 118 and nesting of each element 202 or attribute 206, may be described. For example, the complex schema 114 may display or otherwise describe a relationship between each parent element 202 and its child elements 202. The complex schema 114 may also describe each attribute 206 within the instance specification 118, and to which element 202 the attribute 206 correlates, as well as any other associations between the elements 202 and attributes 206. The complex schema 114 may also include rules 204 describing how the elements 202 relate to other elements 202, how the attributes 206 define the elements 202 with which the attributes 206 are associated, or other rules 204 corresponding to the structure or otherwise.

In one embodiment, an XML structure is a structure compatible with nested elements 202 or nodes, such as a tree structure. The structure may include one or more parent nodes, and each parent node may include child nodes. Further, each child node may have additional child nodes. Each node in the structure may include an element 202 and one or more attributes 206 describing the element 202. Because an XML structure may include many elements 202 and attributes 206, implementing an XML schema for such an XML structure may become very complex.

The complex XML schema 114 may also include high-level domain concepts that are generic or abstract. Additionally, the complex schema 114 may include recursive components that lead to instances with arbitrarily deep nested elements 202. In some embodiments, instances 120 of the complex schema 114 also include a high ratio of fixed data 126 to variable data 128. The complex schema 114 may also include rules 204 that define relationships between two or more elements 202 within the structure, how elements 202 are implemented, or other specifications corresponding to implementation of the complex schema 114.

Figure 3:
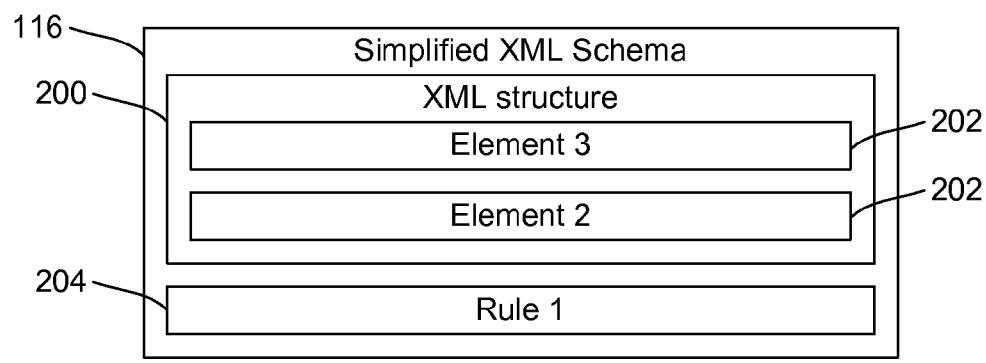
FIG. 3 depicts a schematic diagram of one embodiment of a simplified XML schema.

FIG. 3 depicts a schematic diagram of one embodiment of a simplified XML schema 116. In the present embodiment, the simplified schema 116 is a simplified version of the complex schema 114 of FIG. 2. The simplified schema 116 includes data from the complex schema 114, but may have fewer elements 202, attributes 206, rules 204, or other components from the complex schema 114. In some embodiments, the simplified schema 116 includes only the variable data 128 from the complex schema 114. This may result in a simplified schema 116 that is significantly different from the complex schema 114, depending on the number of variable pieces of information in the original complex schema 114.

The simplified schema 116 may include any number of parent nodes or child nodes from the complex schema 114. Each parent node in the simplified schema 116 may include some, all, or none of the child nodes associated with the parent node in the complex schema 114. Regardless of the number of child nodes for each parent node that are included in the simplified schema 116 from the complex schema 114, the simplified schema 116 maintains the same cardinality as the complex schema 114. The simplified schema 116 may also include any rules 204 included in the complex schema 114 such that instances 122 of the simplified schema 116 may be expanded into instances 120 of the complex schema 114.

In some embodiments, the XML modeling system 100 may add additional components to the simplified schema 116 to aid in expanding instances 122 of the simplified schema 116 to instances 120 of the complex schema 114. In other embodiments, the XML modeling system 100 may store the additional components, mapping information between the complex schema 114 and the simplified schema 116, or structure information for the instance specification 118 in another location separate from the simplified schema 116.

Figure 4:
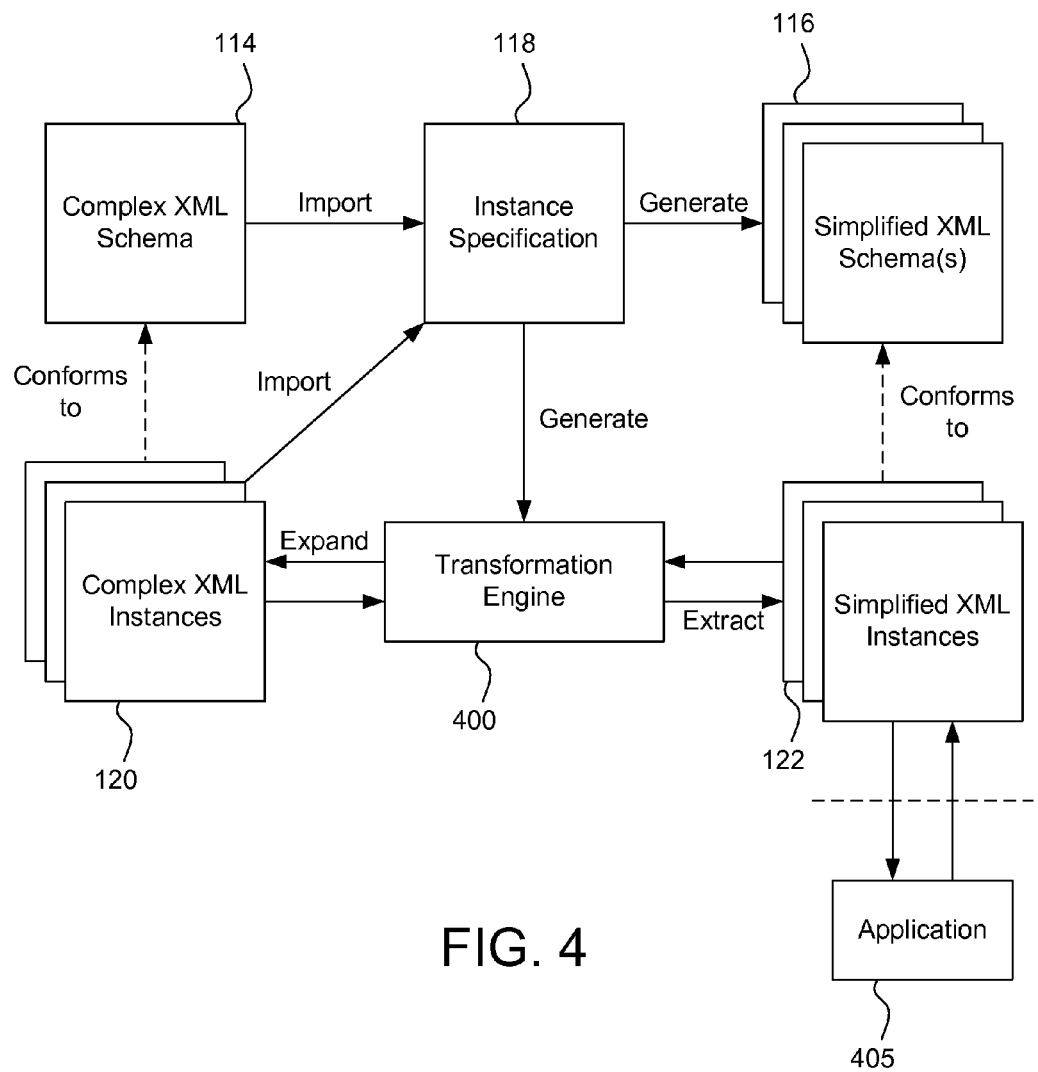
FIG. 4 depicts a flow chart diagram of one embodiment of a run-time implementation of the XML modeling system of FIG. 1.

FIG. 4 depicts a flow chart diagram of one embodiment of a run-time implementation of the XML modeling system 100 of FIG. 1. In one embodiment, the design-time engine 110 performs operations to create the simplified schema 116 from the complex schema 114, and the run-time engine 112 performs operations to transform instances 122 of the simplified schema 116 to instances 120 of the complex schema 114 and vice versa. In some embodiments, the design-time engine 110 and the run-time engine 112 may perform various operations simultaneously.

The design-time engine 110 imports the instance specification 118 from the complex XML schema 114 and may import one or more instances 120 of the complex XML schema 114 to generate the simplified schema 116. In some embodiments, the design-time engine 110 creates more than one simplified schema 116 using the instance specification 118. Each of the generated simplified schemas 116 may correspond to a particular use-case scenario related to the complex schema 114. The different versions of simplified schemas 116 may allow for easier maintenance and reuse across the various use-case scenarios.

In one embodiment the instance specification 118 includes mapping information to describe the relationship between each of the types 124 in the simplified schema 116 and how those types 124 correspond to types 124 or in the complex schema 114. During the run-time implementation, the transformation engine 400 is able to retrieve the persisted instance specification 118 and extract the mapping information from the instance specification 118. In other embodiment, the XML modeling system 100 may store the mapping information separately from the instance specification 118. In such embodiments, the transformation engine 400 may retrieve the instance specification 118 and the mapping information corresponding to the complex schema 114 for the instance specification 118.

When an application 405 communicating with the XML modeling system 100 attempts to produce an instance 120 of the complex schema 114, the XML modeling system 100 creates an instance 122 of the simplified schema 116 and passes the instance 122 of the simplified schema 116 to the transformation engine 400. The transformation engine 400 then uses the mapping information and the instance specification 118 to convert (or "expand") the instance 122 of the simplified schema 116 into an instance 120 of the complex schema 114. The expanded instance may exactly match an original instance 120 of the complex schema 114.

In one embodiment, an application 405 may attempt to "extract" instances 122 of the simplified schema 116 from an instance 120 of the complex schema 114. The XML modeling system 100 passes the instance 120 of the complex schema 114 to the transformation engine 400, which uses the instance specification 118 and the mapping information to extract an instance 122 of the simplified schema 116 from the complex instance 120. The transformation engine 400 may use a heuristic based on multiple instances 120 of the complex schema 114, previous extraction operations or based on the generation of the simplified schema 116 in order to accurately construct the simplified instance(s) 122.

In some embodiments, multiple simplified schemas 116 are derived from a single complex schema 114. The mapping information may map each of the simplified schemas 116 to the complex schema 114. Consequently, the transformation engine 400 may use the mapping information to expand or extract an instance of any of the simplified schemas 116.

FIG. 5 depicts a flow chart diagram of one embodiment of a method 500 for simplifying an XML schema. Although the method is described in conjunction with the XML modeling system 100 of FIG. 1, embodiments of the method may be implemented with other types 124 of XML modeling systems 100.

In one embodiment, the XML modeling system 100 creates 505 a new instance specification 118 that corresponds to an existing complex XML schema 114 that has been imported into the system 100. The complex schema 114 may include a highly complex structure and variable data 128 and/or fixed data 126. The XML modeling system 100 identifies 510 which data is fixed and which data is variable. In some complex schemas 114, the ratio of fixed data 126 to variable data 128 may be large. The fixed data 126 may be values that are the same across all instances 120 of the complex schema 114 for any given field, element 202, attribute 206, or otherwise.

In one embodiment, the operation of identifying the data as fixed or variable may be a manual process performed by a user. The user may also input a value for the fixed data 126. In another embodiment, the operation of identifying the pieces of data as fixed or variable is an automated operation. The automated operation may include analyzing existing instances 120 of the complex schema 114 for common values over the existing instances. The values for fixed data 126 may be stored in the memory device 102 or other electronic storage device or medium.

In one embodiment, the XML modeling system 100 then automatically determines 515 a new set of types 124 encapsulating the variable data 128. Including only the variable data 128 when generating the simplified schema 116 may help reduce the complexity of the schema. The set of types 124 are captured 520 as metadata annotations associated with the instance specification 118. This may include a mapping that the XML modeling system 100 later uses to transform instances from the complex schema 114 to the simplified schema 116 and from the simplified schema 116 to the complex schema 114. The structure in the simplified schema may be the same as the structure in the complex schema.

In some embodiments, the XML modeling system 100 may then refine 525 the types 124 through a variety of operations to reduce the complexity of the schema even further. Refining the types 124 may allow the system 100 to further simplify the complex schema 114. The refinement operations may include renaming types 124, simple type conversion, simplification of the XML structure, cardinality restrictions on certain types 124, elements 202, or attributes 206 within the structure, and other operations. The refinement process may be automated or manual. In one embodiment, the set of types 124 is refined according to refinement preferences selected by the user at design-time.

The XML modeling system 100 then generates 530 a simplified schema 116 from the annotated instance specification 118 using the set of types 124. In some embodiments, the system 100 generates more than one simplified schema 116 from the instance specification 118. Each simplified schema 116 may correspond to a different use-case that relates to the complex schema 114. The simplified schema 116 may maintain the same cardinality as the complex schema 114.

In some embodiments, during run-time, after creating the simplified XML schema 116, the XML modeling system 100 may then create instances 122 of the simplified schema 116. The simplified instances 122 may be extracted from complex instances 120 based on the instance specification 118. Mapping information may be used to extract a simplified instance 122 from the complex instances 120 for use with a particular application 405. The system 100 may also use a heuristic to extract simplified instances 122 from one or more complex instances 120. The heuristic may be based on existing instances 120 of the complex schema 114. In other embodiments, the simplified instances 122 may be expanded into instances 120 of the complex schema 114 using the mapping information corresponding to the instance specification 118.

An embodiment of an XML modeling system 100 includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including an operation for simplifying a complex XML schema 114.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. A computer readable storage medium or device is a specific type of computer-readable or -usable medium. Examples of a computer-readable storage medium include a semiconductor or solid state memory, magnetic tape, a removable computer diskette, a random access memory (RAM), a read-only memory (ROM), a rigid magnetic disk, and an optical disk. Hardware implementations including computer readable storage media also may or may not include transitory media. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types 124 of network adapters.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer program product, comprising:
a computer readable storage device to store a computer readable program, wherein the computer readable program, when executed by a processor within a computer, causes the computer to perform operations for simplifying an extensible markup language (XML) schema, the operations comprising:
identifying data in an instance specification as variable data and fixed data, wherein the instance specification corresponds to a complex XML schema;
determining a set of types comprising the variable data, wherein the set of types conforms to a structure of the complex XML schema;
capturing the set of types as metadata annotations associated with the instance specification;
generating a simplified XML schema for the instance specification using the set of types; and
extracting an instance of the simplified XML schema from an instance of the complex XML schema based on mapping information corresponding to the instance specification and a heuristic for existing instances of the complex XML schema.

2. The computer program product of claim 1, wherein identifying the data as variable data and fixed data is an automated operation based on a plurality of XML instances corresponding to the complex XML schema.

3. The computer program product of claim 1, wherein identifying the data as variable data and fixed data is a manual operation performed by a user, wherein the user marks variable data.

4. The computer program product of claim 1, wherein the computer program product, when executed on the computer, causes the computer to perform additional operations, comprising:

refining the set of types by manipulating the set of types, wherein the simplified XML schema is generated using the refined set of types.

5. The computer program product of claim 4, wherein refining the set of types comprises manipulating the set of types according to refinement preferences selected by a user at design-time.

6. The computer program product of claim 1, wherein the computer program product, when executed on the computer, causes the computer to perform additional operations, comprising:
expanding an instance of the simplified XML schema into an instance of the complex XML schema based on mapping information corresponding to the instance specification.

7. A method for simplifying an extensible markup language (XML) schema, comprising:
identifying data in an instance specification as variable data and fixed data, wherein the instance specification corresponds to a complex XML schema;
determining a set of types comprising the variable data, wherein the set of types conforms to a structure of the complex XML schema;
capturing the set of types as metadata annotations associated with the instance specification;
generating a simplified XML schema for the instance specification using the set of types, wherein the simplified XML schema is stored on a memory device; and
extracting an instance of the simplified XML schema from an instance of the complex XML schema based on mapping information corresponding to the instance specification and a heuristic for existing instances of the complex XML schema.

8. The method of claim 7, wherein identifying the data as variable data and fixed data is an automated operation based on a plurality of XML instances corresponding to the complex XML schema.

9. The method of claim 7, wherein identifying the data as variable data and fixed data is a manual operation performed by a user, wherein the user marks variable data and inputs a value for fixed data.

10. The method of claim 7, further comprising refining the set of types by manipulating the set of types, wherein the simplified XML schema is generated using the refined set of types.

11. The method of claim 10, wherein refining the set of types comprises manipulating the set of types according to refinement preferences selected by a user at design-time.

12. The method of claim 7, further comprising expanding an instance of the simplified XML schema into an instance of the complex XML schema based on mapping information corresponding to the instance specification.

13. An extensible markup language (XML) modeling system, comprising:
a design-time engine configured to:
identify data in an instance specification as variable data and fixed data, wherein the instance specification corresponds to a complex XML schema;
determine a set of types comprising the variable data, wherein the set of types conforms to a structure of the complex XML schema;
capture the set of types as metadata annotations associated with the instance specification;
generate a simplified XML schema for the instance specification using the set of types; and
extract an instance of the simplified XML schema from an instance of the complex XML schema based on mapping information corresponding to the instance specification and a heuristic for existing instances of the complex XML schema; and
a memory device configured to store the simplified XML schema.

14. The system of claim 13, wherein identifying the data as variable data and fixed data is an automated operation based on a plurality of XML instances corresponding to the complex XML schema.

15. The system of claim 13, wherein identifying the data as variable data and fixed data is a manual operation performed by a user, wherein the user marks variable data and inputs a value for fixed data.

16. The system of claim 13, wherein the design-time engine is further configured to refine the set of types by manipulating the set of types, wherein the simplified XML schema is generated using the refined set of types.

17. The system of claim 13, further comprising a run-time engine configured to:
expand the instance of the simplified XML schema into an instance of the complex XML schema based on mapping information corresponding to the instance specification.

* * * * *